United States Patent
Lyu et al.

(10) Patent No.: US 8,432,453 B2
(45) Date of Patent: Apr. 30, 2013

(54) METHOD AND SYSTEM OF STARTING SNAPPING STATIC SCENE

(75) Inventors: Szu-Hao Lyu, Taipei (TW); Chien-Nan Yu, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 456 days.

(21) Appl. No.: 12/762,062

(22) Filed: Apr. 16, 2010

(65) Prior Publication Data

US 2011/0157376 A1 Jun. 30, 2011

(30) Foreign Application Priority Data

Dec. 25, 2009 (TW) .............................. 98144964 A

(51) Int. Cl.
*H04N 5/225* (2006.01)
*H04N 5/228* (2006.01)
*H04N 5/208* (2006.01)

(52) U.S. Cl.
USPC .................... 348/207.11; 348/222.1; 348/252

(58) Field of Classification Search ........................ None
See application file for complete search history.

(56) References Cited

U.S. PATENT DOCUMENTS

| | | | | |
|---|---|---|---|---|
| 7,720,364 B2 * | 5/2010 | Scott et al. | | 396/50 |
| 8,014,567 B2 * | 9/2011 | Yoon et al. | | 382/103 |
| 8,194,921 B2 * | 6/2012 | Kongqiao et al. | | 382/103 |
| 2003/0063102 A1 * | 4/2003 | Rubinstenn et al. | | 345/619 |
| 2010/0016019 A1 * | 1/2010 | Harris | | 455/557 |

* cited by examiner

*Primary Examiner* — Luong T Nguyen
(74) *Attorney, Agent, or Firm* — Kirton McConkie; Evan R. Witt

(57) ABSTRACT

A method of starting snapping a static scene is applied to a system, which is electrically connected with an image-capturing device and a display device. The display device has a displaying zone for display a visual field of the image-capturing device. After an instruction of setting a block in the displaying zone is received by the system, a skin color coverage percentage of the block is calculated. According to the skin color coverage percentage, the system determines whether the scene within the visual field is stored or not. By the method and system of the present invention, a self-timer function is activated according to the skin color.

16 Claims, 7 Drawing Sheets

METHOD AND SYSTEM OF STARTING SNAPPING STATIC SCENE

FIELD OF THE INVENTION

The present invention relates to a method and a system of starting snapping a static scene, and more particularly to a method and a system of starting snapping a static scene for use in a web camera.

BACKGROUND OF THE INVENTION

With increasing development of digital technologies, electronic devices having an image-capturing function have experienced great growth and are now rapidly gaining in popularity. On account of their convenience, the users can use these electronic devices wherever and whenever they are. Generally, the image-capturing device such as a digital camera or a video camera can be operated in a self-timer mode in order to enhance the utilization. There are two approaches for operating the self-timer mode. According to the first approach, a control button is mounted on the main body of the image-capturing device or installed on another device that is connected to the main body of the image-capturing device through a connecting wire. By pressing the control button, the self-timer mode is triggered to capture the image. Generally, for facilitating the user to have sufficient time to prepare the snapping task, the image is automatically captured after the self-timer mode has been triggered for a predetermined delaying time. According to the second approach, the self-timer function of the image-capturing device is triggered by a wireless transmission technology (e.g. an IR transmission technology). Since a discrete wireless controller is used to control the self-timer function, the possibility of losing or forgetting the wireless controller is increased.

In a case that the above controlling approaches are used in a web camera, some drawbacks occur. For example, after the web camera is installed on the host computer or its peripheral device and electrically connected with the host computer, a specified button or touch pad is pressed to trigger the image-capturing function of the web camera. In a case that both hands of the user fail to press the specified button or touch pad (for example a baby or a pet is embraced by the user's both hands), the conventional controlling approaches are no longer feasible for triggering the image-capturing function of the web camera. Moreover, especially when a static scene is intended to be snapped, the shake of the to-be-snapped object in the scene or the web camera results in deteriorated image quality of the stored static scene.

Therefore, there is a need of providing a method of starting snapping a static scene in order to improve or enhance the image quality of the static scene.

SUMMARY OF THE INVENTION

The present invention provides a method and a system of starting snapping a static scene by presetting a specified block for starting snapping the scene in order to avoid inconvenience of general starting snapping the static scene through an input device.

The present invention also provides a method and a system of starting snapping a static scene by presetting a specified block for triggering a function of capturing and storing the static scene. The method of the present invention judges whether the static scene is captured and stored according to the skin color coverage percentage of the block.

The present invention further provides a method and a system of starting snapping a static scene by detecting an edge intensity of a scene to judge whether any object is still shaking, thereby optimizing the quality of the captured static scene.

In accordance with an aspect of the present invention, there is provided a method of starting snapping a static scene for use with an image-capturing device and a display device electrically connected with the image-capturing device. The display device has a displaying zone for display a visual field of the image-capturing device. The method includes the following steps. Firstly, a block is set in the displaying zone. The block is correlated with a portion of the visual field. Then, a skin color coverage percentage of the block is calculated. Then, the skin color coverage percentage is compared with a first threshold value, which is a positive number greater than zero. Once the image-capturing device is in a first operating status, the scene is continuously captured by the image-capturing device. If the skin color coverage percentage is greater than the first threshold value, the image-capturing device in the first operating status is switched to a second operating status. Once the image-capturing unit is in the second operating status, a delaying time is counted. The scene is captured and stored after the delaying time.

In an embodiment of the method, after the image-capturing device is in the second operating status and before the delaying time is counted, an edge intensity of the scene within the visual field is generated. If the edge intensity is greater than a second threshold value, the delaying time starts to be counted.

In an embodiment of the method, a count of the delaying time is shown on the display device during the delaying time is counted.

In accordance with another aspect of the present invention, there is provided a snapping method for use with an image-capturing device and a display device electrically connected with the image-capturing device. The display device has a displaying zone for display a visual field of the image-capturing device. A block correlated with a portion of the visual field is set in the displaying zone. The snapping method includes the following steps. Firstly, a skin color coverage percentage of the block is calculated. If the skin color coverage percentage is present, the image-capturing device is switched to a first operating status or a second operating status.

In accordance with a further aspect of the present invention, there is provided a snap starting system. The snap starting system includes an image-capturing unit, an input unit, an output unit and a processing unit. The image-capturing unit is used for capturing a scene within a visual field. The input unit is used for setting a block. The output unit is used for displaying the visual field and the block. The processing unit is electrically connected with the image-capturing unit, the input unit and the output unit for calculating a skin color coverage percentage of the block, and switching the image-capturing unit to a first operating status or a second operating status in response to the skin color coverage percentage.

In an embodiment of the snap starting system, the processing unit further calculates an edge intensity of the scene, and judges whether the delaying time starts to be counted according to the edge intensity.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
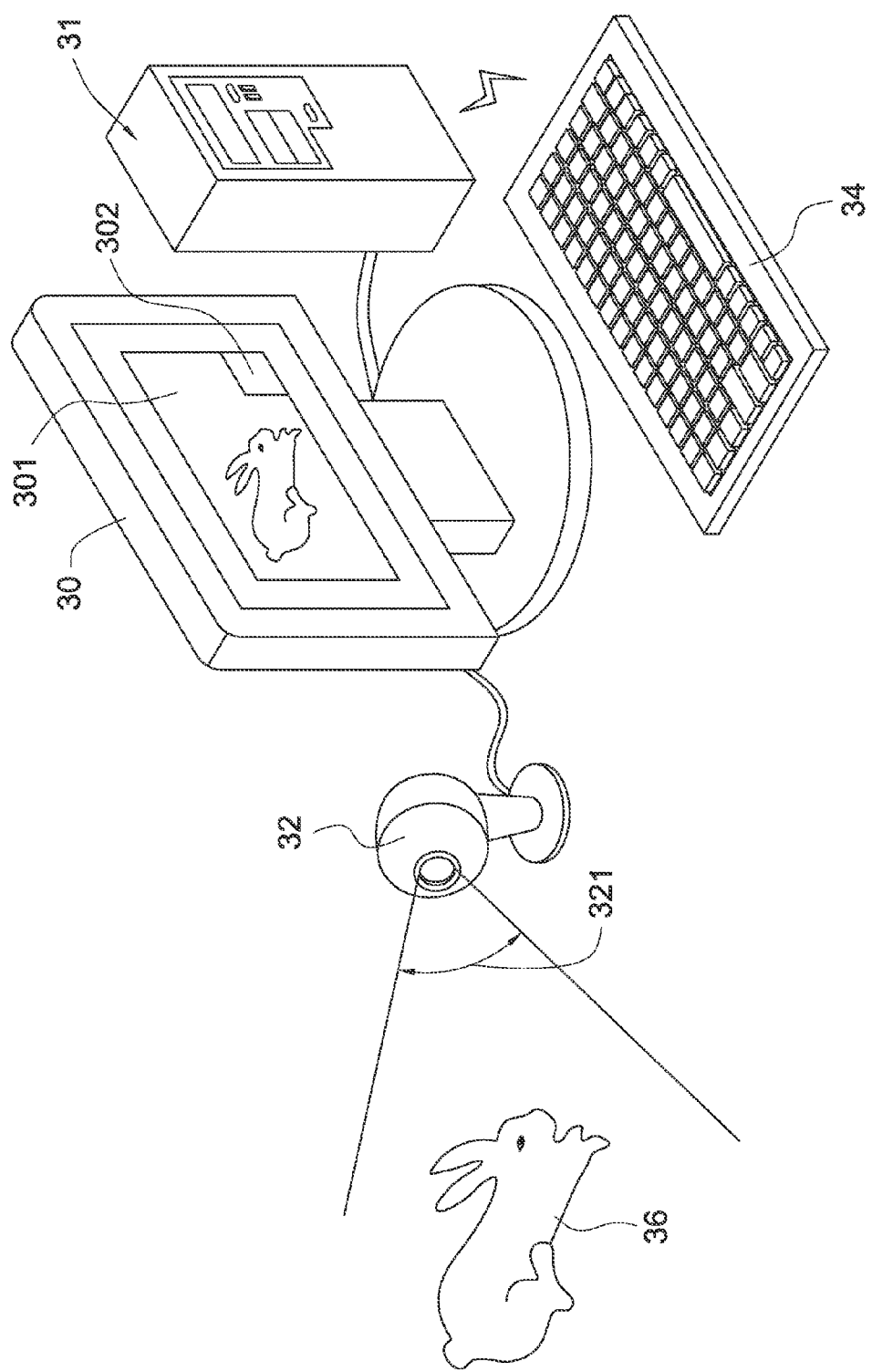
FIGS. 1 and 2 are schematic diagrams illustrating an application system by using a method of starting snapping a static scene according to an embodiment of the present invention.
Figure 2:
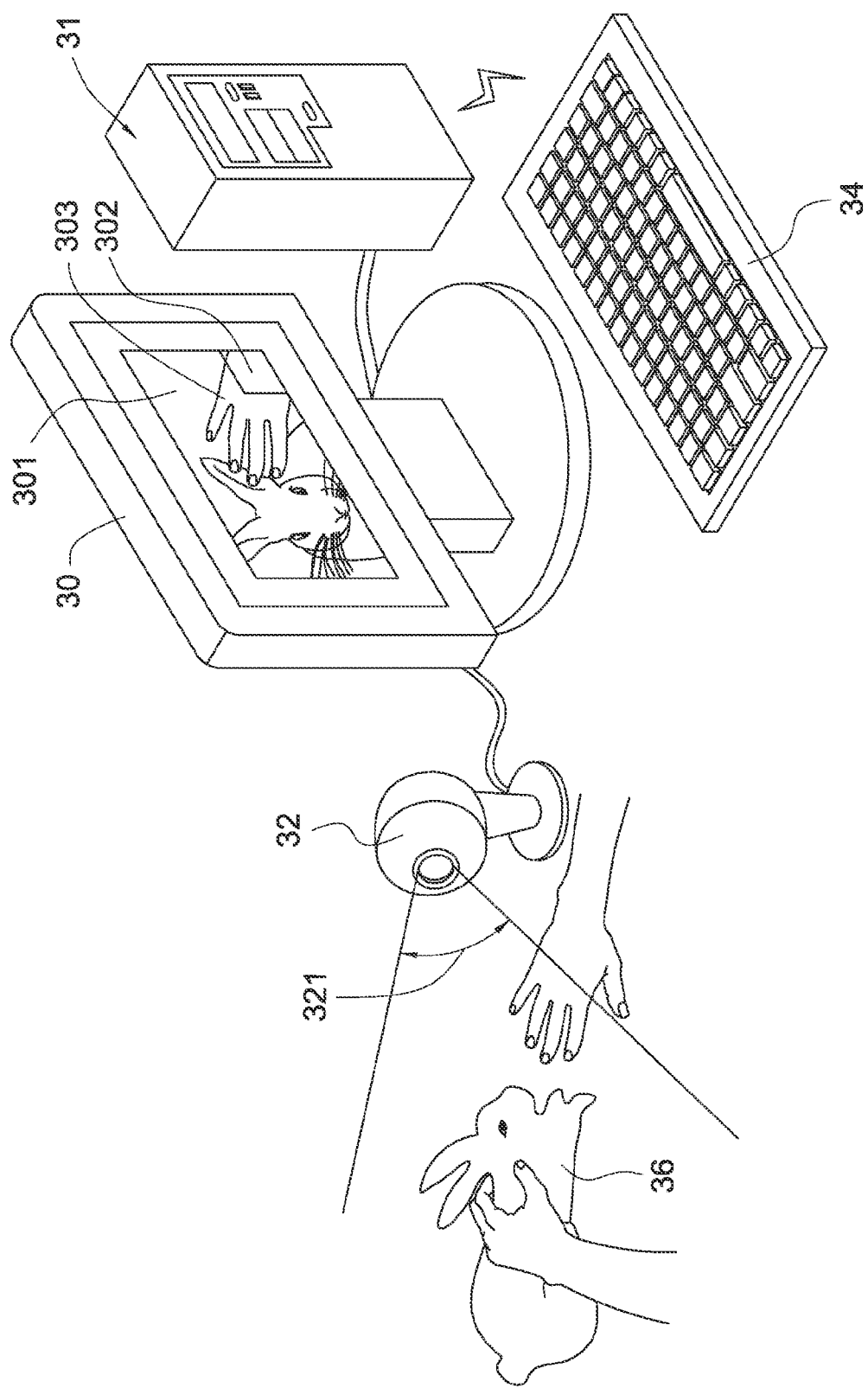

FIGS. 1 and 2 are schematic diagrams illustrating an application system by using a method of starting snapping a static scene according to an embodiment of the present invention. As shown in FIG. 1, the method of starting snapping a static scene of the present invention is applied to a display device 30 and an image-capturing device 32, which are electrically connected with a host computer. The host computer comprises an input device 34 and a processing unit 31. In an example, a to-be-snapped object 36 is within a visual field 321 of the image-capturing device 32. When the display device 30 is electrically connected with the image-capturing device 32, a displaying zone 301 on the display device 30 displays the visual field 321 of the image-capturing device 32. In a case that the to-be-snapped object 36 enters the visual field 321 of the image-capturing device 32, the image of the to-be-snapped object 36 is shown on the displaying zone 301. In accordance with a key feature of the present invention, via the input device 34, the user could set a specified block 302 for triggering a scene-storing function. FIG. 1 is illustrated by referring to a rectangular block 302. Nevertheless, the shape and size of the block 302 could be adjusted according to the user's settings. For example, if the range of the block 302 is set to be equal to the displaying zone 301, it is meant that the overall visual field 321 of the image-capturing device 32 is served as the block 302.

After the block 302 is set, the scene-storing function could be triggered according to the naked skin site of the user. As shown in FIG. 2, the to-be-snapped object 36 is a moving animal. After the to-be-snapped object 36 is caught by a hand of the user, the naked skin site of the other hand of the user could be partially placed within the visual field 321 of the image-capturing device 32, especially placed within the region corresponding to the block 302. By calculating the skin color coverage percentage of the block 302, the processing unit 31 will judge whether the scene-storing function is triggered or not. In this embodiment, the image of the naked skin site 303 of the user is displayed on the displaying zone 301. As can be seen from FIG. 2, the block 302 is partially covered by the naked skin site 303. According to the skin color coverage percentage of the block 302, the processing unit 31 will judge whether the scene within the visual field 321 is snapped and stored or not. Moreover, the action of snapping and storing the scene within the visual field 321 is performed by the processing unit 31 after a delaying time.

Figure 3:
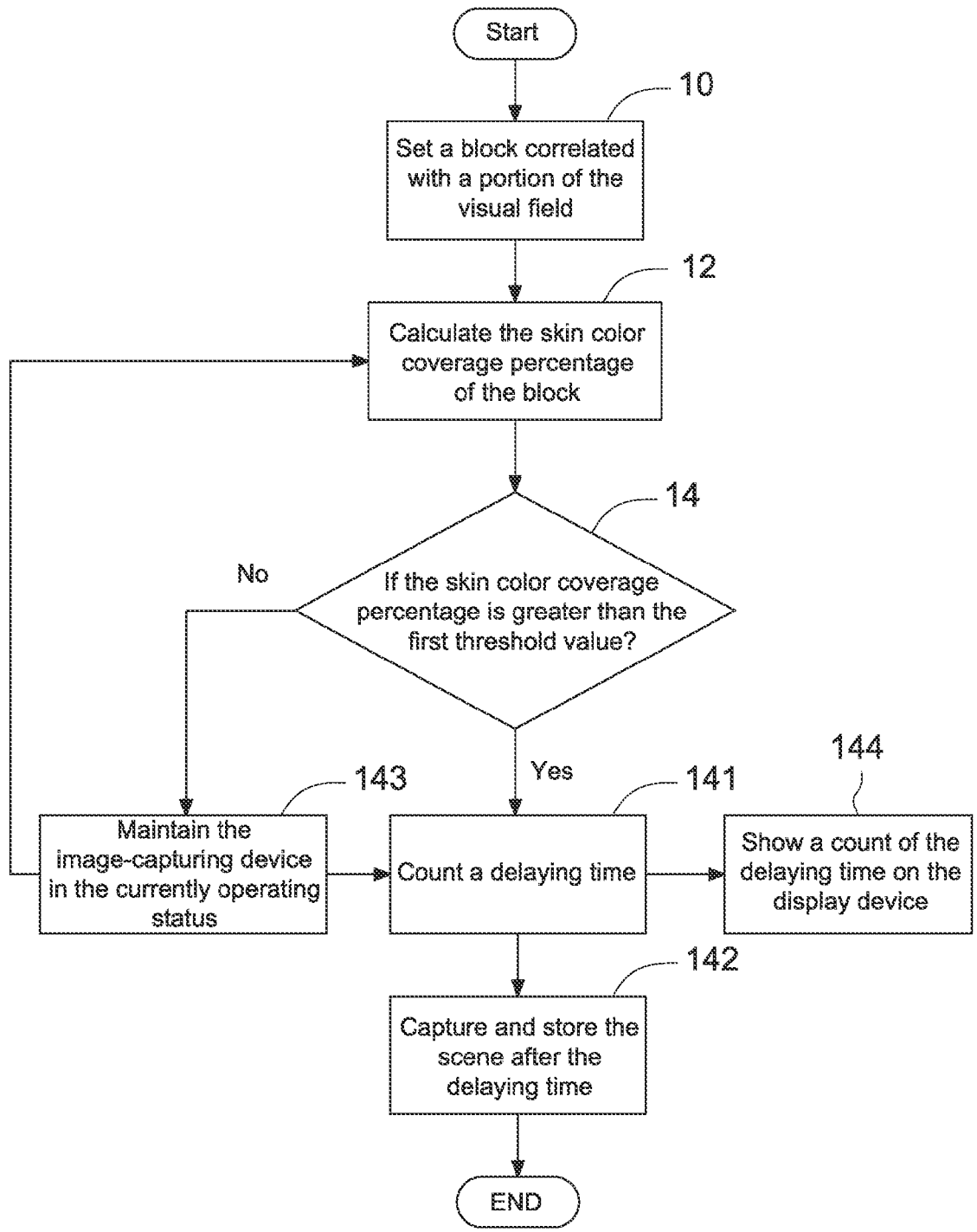
FIG. 3 is a flowchart illustrating a method of starting snapping a static scene according to a first embodiment of the present invention.

FIG. 3 is a flowchart illustrating a method of starting snapping a static scene according to a first embodiment of the present invention. This method is applied to an image-capturing device and a display device electrically connected with the image-capturing device. By this method, a static scene is captured by the image-capturing device and then stored in the storage unit of a host computer. The display device is a monitor of a desktop computer or a display screen of a laptop computer. The display device has a displaying zone for displaying the visual field of the image-capturing device. In addition to the displaying zone, the display device may also include the operating frame corresponding to the operating system or other software that is being executed in the computer. An exemplary image-capturing device is a webcam (web camera or network camera) for capturing a static scene, a dynamic scene, or both.

Via the input device, an instruction is transmitted to the host computer. For example, by pressing specified keys of a keyboard, moving a cursor with a mouse, writing in a handwriting board, pressing a control button or touching the display device, a portion of the displaying zone is marked as a block and then the block is correlated with a portion of the visual field. The setting action generates an instruction to the host computer. According to the instruction, the block correlated with a portion of the visual field is set by the host computer (Step 10). The shape and size of the block are determined by the user. After the block is set, the portion of the visual field corresponding to the block is processed by the host computer (for example periodically processed) in order to calculate the skin color coverage percentage of the block (Step 12). The term "skin color coverage percentage" indicates the fraction of skin color included in the block. Since the skin color coverage percentage is utilized to trigger the scene-storing function, the user's skin site (e.g. naked hand, foot or face) entering the portion of the visual field can trigger the scene-storing function. The factors influencing the skin color includes for example, color and thickness of the skin, number and distribution of melanin particles, content of carotene or other pigment, blood, or the like. Generally, the skin color is analyzed according to a skin color model table. In accordance with the present invention, the equations mapping the skin color of the RGB space to the YCbCr color space can be rearranged to yield Cr and Cb as the functions: $Y=0.299 \times R + 0.587 \times G + 0.114 \times B$, $Cb=0.564 \times (B-Y) = -0.169 \times R - 0.331 \times G + 0.500 \times B$; and $Cr=0.713 \times (R-Y) = 0.500 \times R - 0.419 \times G - 0.081 \times B$. In these equations, Y is the luminance component, and Cb and Cr are the blue-difference and red-difference chromance components. In this embodiment, the skin color has the following parameters: $60 < y < 255$, $-25 < Cb < 0$, and $10 < Cr < 45$.

The fraction of skin color included in the block and calculated by the above equations is defined as the skin color coverage percentage of the block. Then, the skin color coverage percentage is compared with a first threshold value to judge whether the skin color coverage percentage is greater than the first threshold value (Step 14). The first threshold value is a positive number greater than zero, or a value not smaller than zero.

When the skin color coverage percentage is greater than the first threshold value during the image-capturing device is being in a first operating status to continuously capture the scene, the image-capturing device will be switched from the first operating status to a second operating status. Once the image-capturing device is switched to the second operating status, a delaying time is counted (Step 141). After the delaying time, the scene is captured and stored (Step 142). Moreover, during the delaying time is counted, a count of the delaying time is shown on the display device (Step 144). On the other hand, if the skin color coverage percentage is not greater than the first threshold value, the image-capturing device is maintained in the currently operating status (Step 143). That is, the image-capturing device is maintained in the first operating status for continuously capturing the scene.

Figure 4:
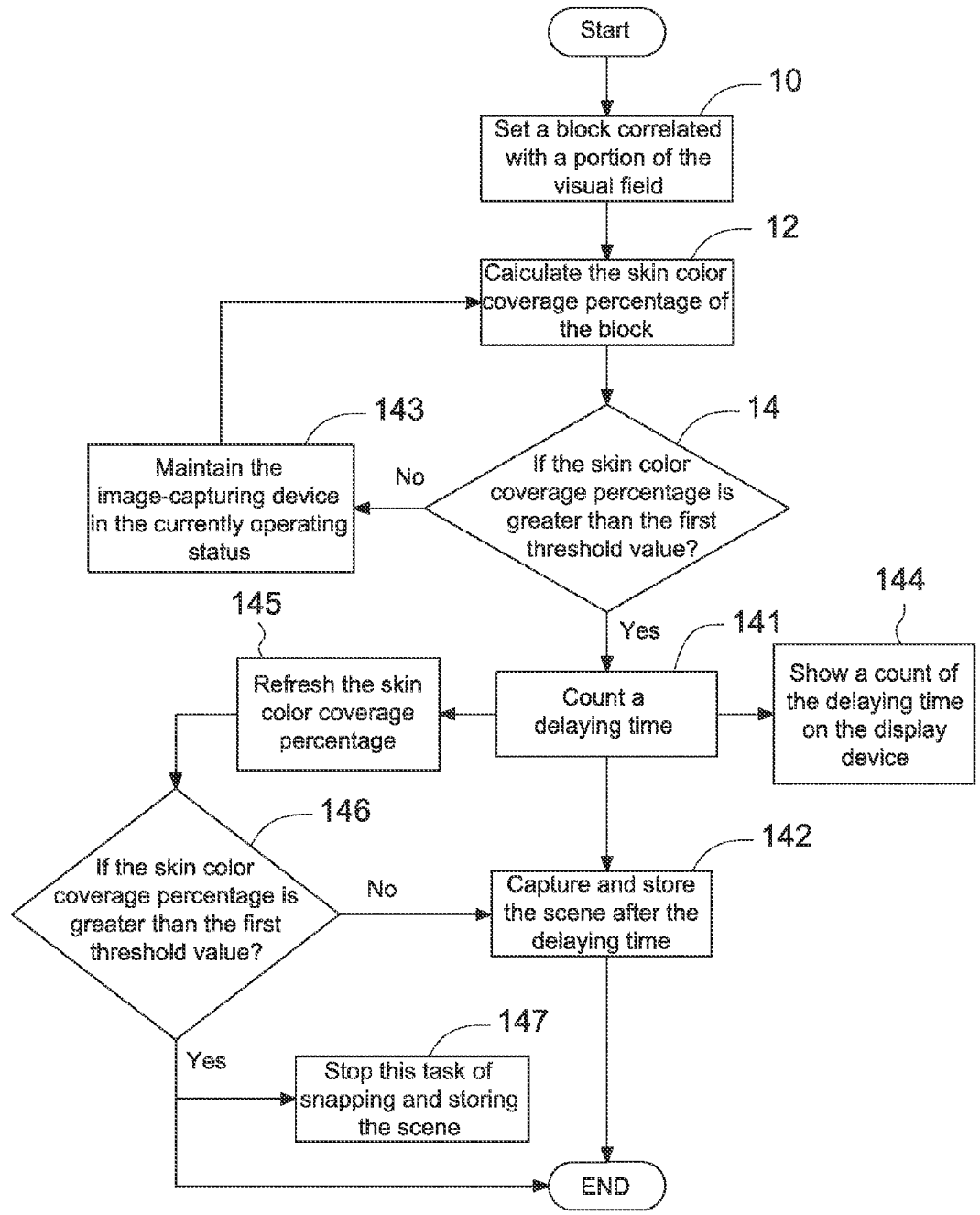
FIG. 4 is a flowchart illustrating a method of starting snapping a static scene according to a second embodiment of the present invention.

FIG. 4 is a flowchart illustrating a method of starting snapping a static scene according to a second embodiment of the present invention. Similarly, if the skin color coverage percentage is greater than the first threshold value, the delaying time is counted (Step 141). In this embodiment, during the delaying time is counted, the skin color coverage percentage is refreshed (Step 145). Then, the refreshed skin color coverage percentage is compared with the first threshold value to judge whether the refreshed skin color coverage percentage is greater than the first threshold value (Step 146). If the refreshed skin color coverage percentage is greater than the first threshold value, the image-capturing device in the second operating status is switched to the first operating status. In other words, in a case that the user intends to stop this snapping task, the naked skin site can also be utilized to stop this snapping task. For example, during the delaying time is counted, the skin color coverage percentage of the block is periodically calculated by the host computer so as to obtain the refreshed skin color coverage percentage. In addition, refreshed skin color coverage percentage is compared with the first threshold value. Alternatively, the host computer will periodically detect whether any skin color is present in the block. Once the skin color coverage percentage reaches the first threshold value or the skin color is present, the task of snapping and storing the scene is stopped (Step 147). Meanwhile, the count of the delaying time originally shown on the display device is interrupted or no longer shown. It is noted that, however, those skilled in the art will readily observe that numerous modifications and alterations of the connection member may be made while retaining the teachings of the invention. For example, other conspicuous prompt could be shown to notify the user that the self-timer mode is interrupted. Moreover, during the delaying time is counted, if the refreshed skin color coverage percentage is not greater than the first threshold value or no skin color is present, the scene is captured and stored after the delaying time (Step 142).

Figure 5:
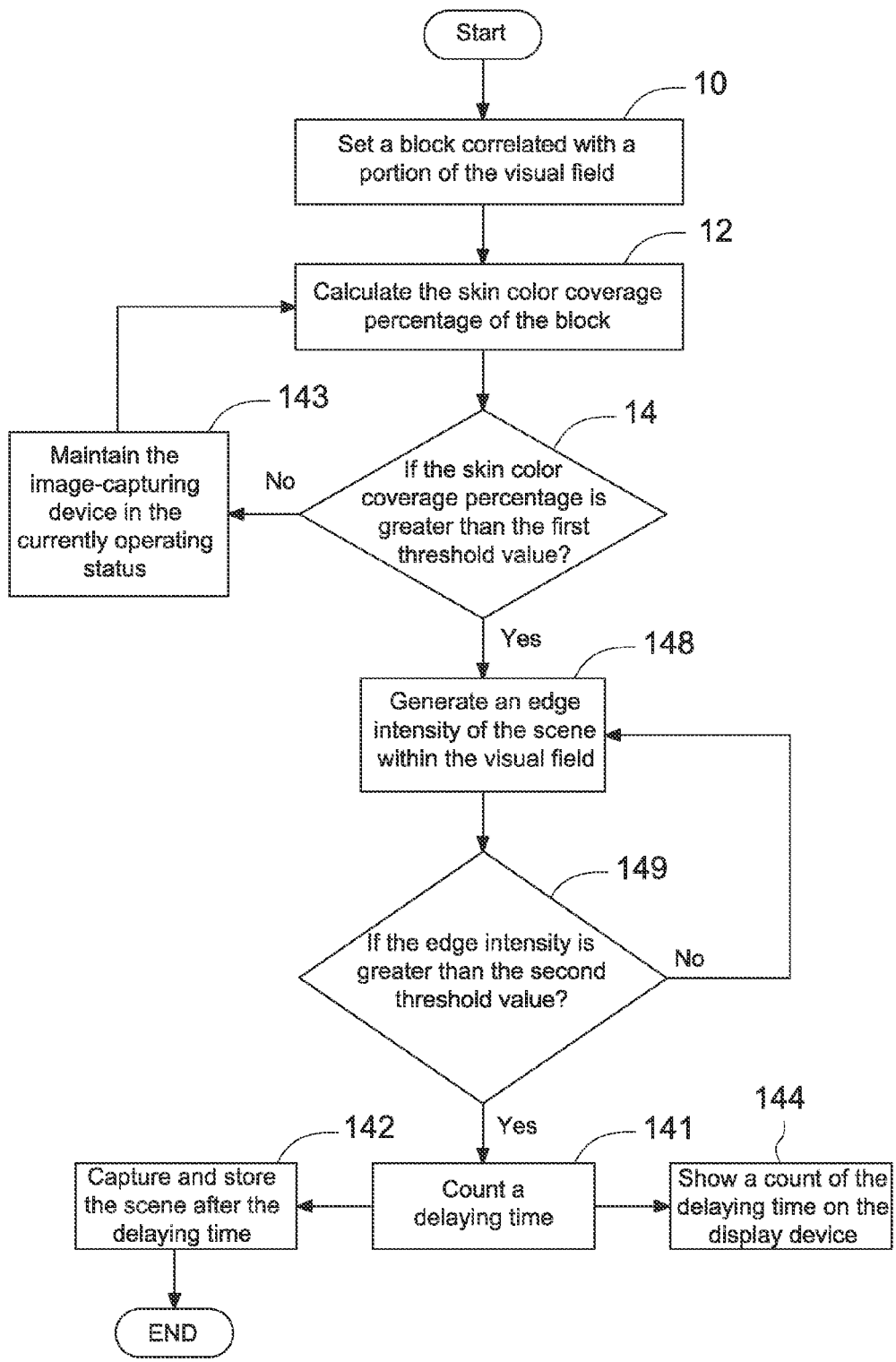
FIG. 5 is a flowchart illustrating a method of starting snapping a static scene according to a third embodiment of the present invention.
Figure 6:
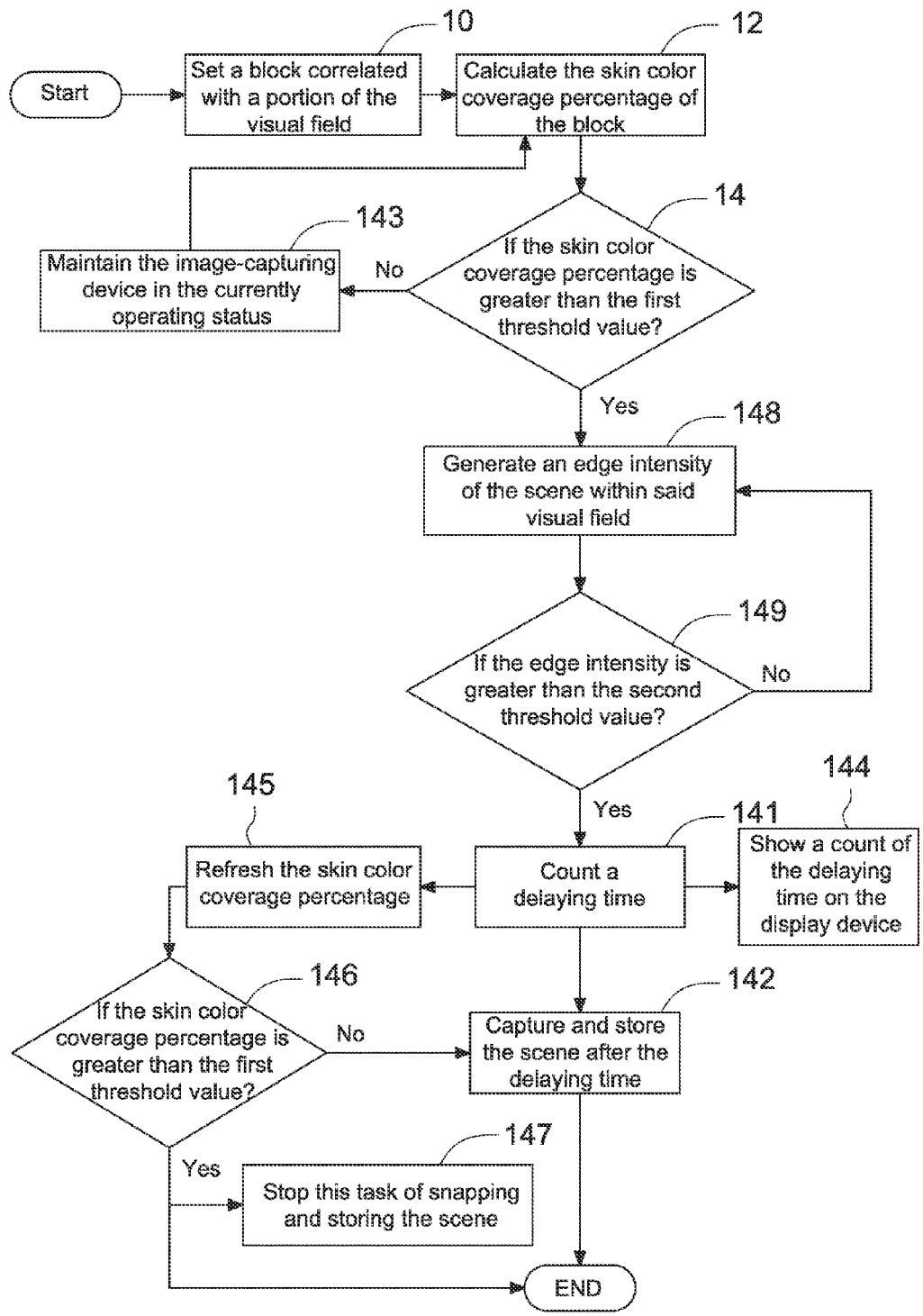
FIG. 6 is a flowchart illustrating a method of starting snapping a static scene according to a fourth embodiment of the present invention.

FIG. 5 is a flowchart illustrating a method of starting snapping a static scene according to a third embodiment of the present invention. When the skin color coverage percentage is greater than the first threshold value during the image-capturing device is in a first operating status to continuously capture the scene, the image-capturing device will be switched from the first operating status to a second operating status. Once the image-capturing device is in the second operating status, an edge intensity of the scene within the visual field is generated (Step 148). Then, the edge intensity is compared with a second threshold value (Step 149). If the edge intensity is not smaller than the second threshold value, a delaying time is counted (Step 141). In comparison with the embodiments of FIGS. 3 and 4, the method of this embodiment further comprises the steps of detecting the edge of the snapped scene (Step 148) and judging whether the delaying time is counted according to the edge detecting result (Step 149). The general edge intensity detection method can detect whether the static scene is blurred. As known, in a case that the subject of the scene is rocked or the image-capturing device is subject to shock, the quality of the static scene is possibly deteriorated. The edge intensity detection method used in the art can be used. For example, an edge intensity detection method base on a modulation transfer function (MTF) can be used to detect the edge intensity. The operating principle of the modulation transfer function is well known in the art, and is not redundantly described herein. The purpose of the edge intensity detection is intended to achieve good quality of the captured and stored static scene. FIG. 6 is a flowchart illustrating a method of starting snapping a static scene according to a fourth embodiment of the present invention. In this embodiment, the step of detecting the refreshed skin color coverage percentage and the step of stopping snapping and storing the scene as shown in FIG. 4 are combined with the flowchart of FIG. 5

The present invention also provides a snapping method. According to the skin color coverage percentage of the block, the image-capturing device is switched to the first operating status or the second operating status. The display device has a displaying zone for display a visual field of the image-capturing device. A block correlated with a portion of the visual field is set in the displaying zone. If the skin color coverage percentage is present, the operating status of the image-capturing device is switched. That is, according to the presence of the skin color coverage percentage, the image-capturing device is switched from the first operating status to the second operating status, or switched from the second operating status to the first operating status.

Figure 7:
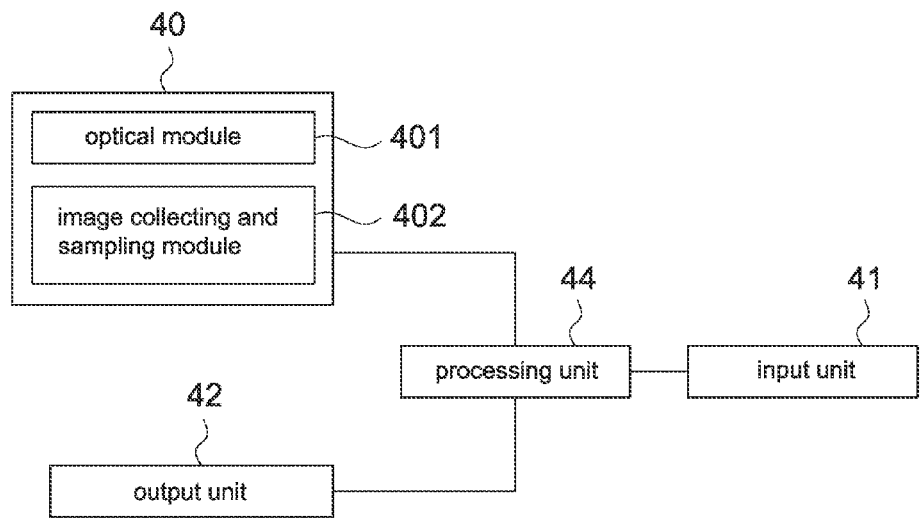
FIG. 7 is a schematic functional block diagram illustrating a snap starting system according to an embodiment of the present invention.

FIG. 7 is a schematic functional block diagram illustrating a snap starting system according to an embodiment of the present invention. As shown in FIG. 7, the snap starting system comprises an image-capturing unit 40, an input unit 41, an output unit 42 and a processing unit 44. An example of the image-capturing unit 40 is a web camera. The image-capturing unit 40 comprises an optical module 401 and an image collecting and sampling module 402. The optical module 401 is an assembly of a lens, a shutter and a filter for providing a visual field. The image collecting and sampling module 402 comprises a charge coupled device (CCD) or a complementary metal-oxide-semiconductor (CMOS) and the peripheral circuit. The image collecting and sampling module 402 is used for sensing and capturing the scene within the visual field. The output unit 42 is a display device for displaying the visual field provided by the optical module 401. In addition, via the input unit 41 (e.g. a mouse or a keyboard), the user could set a specified block for triggering a scene-storing function. The processing unit 44 comprises a processor of a host computer and the peripheral circuit thereof. The processing unit 44 is electrically connected with the image-capturing unit 40, the input unit 41 and the output unit 42. The scene captured by the image-capturing unit 40 and the block setting instruction generated by the input unit 41 are processed by the processing unit 44. Moreover, in a case that the snap starting system has a function of detecting the edge intensity of the scene, the processing unit 44 is used for calculating the edge intensity of the scene. According to the edge intensity of the scene, the delaying time is counted and/or the scene-storing function is triggered.

Figure 8:
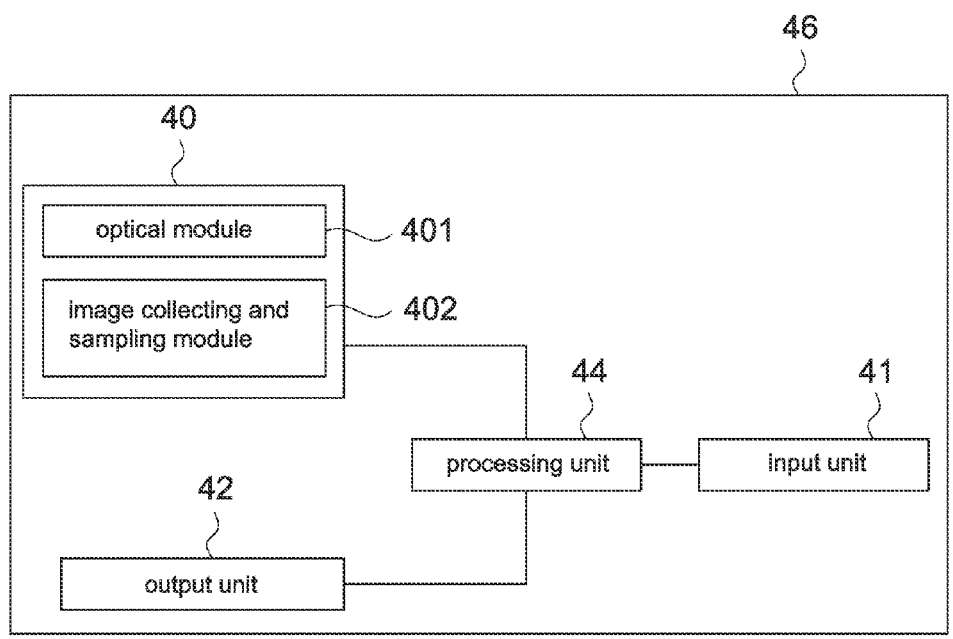
FIG. 8 is a schematic functional block diagram illustrating a snap starting system according to another embodiment of the present invention.

FIG. 8 is a schematic functional block diagram illustrating a snap starting system according to another embodiment of the present invention. In this embodiment, the image-capturing unit 40, the input unit 41, the output unit 42 and the processing unit 44 are integrated into an electronic device 46. For example, the electronic device is a laptop computer with a camera lens.

From the above description, the method of starting snapping a static scene according to the present invention can be applied to an image-capturing device such a discrete web camera or a built-in camera of the computer. The block for starting the snapping task can be set by the user. Since the skin occupies the highest area of the humans' body, the skin color is a suitable triggering index for starting the snapping task.

The snap starting method of the present invention comprises the step of capturing and storing the static scene after a delaying time. The delaying time allows the moving object of the scene to be held steady. As a consequence, the imaging quality of the captured static scene is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of starting snapping a static scene for use with an image-capturing device and a display device electrically connected with said image-capturing device, said display device having a displaying zone for display a visual field of said image-capturing device, said method comprising steps of:
    setting a block in said displaying zone, wherein said block is correlated with a portion of said visual field;
    calculating a skin color coverage percentage of said block;
    comparing said skin color coverage percentage with a first threshold value, wherein said static scene is continuously captured by said image-capturing device in a first operating status, and wherein if said skin color coverage percentage is greater than said first threshold value, said image-capturing device in said first operating status is switched to a second operating status, and wherein a delaying time is counted and said static scene is captured and stored after said delaying time when said image-capturing device is in said second operating status;
    refreshing said skin color coverage percentage of said block while said delaying time is counted; and
    comparing said refreshed skin color coverage percentage with said first threshold value, wherein if said refreshed skin color coverage percentage is greater than said first threshold value, said image-capturing device in said second operating status is switched to said first operating status.

2. The method of starting snapping a static scene according to claim 1 wherein after said first operating status is switched to said second operating status, a count of said delaying time is shown on said display device during said delaying time is counted.

3. The method of starting snapping a static scene according to claim 1 wherein once said image-capturing device is switched to said first operating status, a snap-stopping message is shown on said display device.

4. The method of starting snapping a static scene according to claim 1 wherein if said refreshed skin color coverage percentage is not greater than said first threshold value, said image-capturing device is maintained in said second operating status.

5. The method of starting snapping a static scene according to claim 1 wherein after said image-capturing device is in said second operating status and before said delaying time is counted, an edge intensity of said static scene within said visual field is generated, wherein if said edge intensity is not smaller than a second threshold value, said delaying time is counted.

6. The method of starting snapping a static scene according to claim 5 wherein a count of said delaying time is shown on said display device during said delaying time is counted.

7. The method of starting snapping a static scene according to claim 1 wherein said first threshold value is a positive number greater than zero.

8. A method of starting snapping of a static scene for use with an image-capturing device and a display device electrically connected with said image-capturing device, said display device having a displaying zone for display a visual field of said image-capturing device, a block correlated with a portion of said visual field being set in said displaying zone, said snapping method comprising steps of:
    calculating a skin color coverage percentage of said block; and
    switching said image-capturing device to a first operating status or a second operating status if said skin color coverage percentage is present, wherein once said image-capturing device is in said first operating status, said static scene is continuously captured by said image-capturing device, wherein once said image-capturing device has been in said second operating status for a delaying time, said static scene is captured and stored after said delaying time, wherein after said image-capturing device is in said second operating status and before said delaying time is counted, an edge intensity of said static scene within said visual field is generated, wherein if said edge intensity is greater than a threshold value, said delaying time is counted.

9. The method of starting snapping a static scene according to claim 8 wherein during said delaying time of said image-capturing device is counted, a count of said delaying time is shown on said display device.

10. The method of starting snapping a static scene according to claim 8 wherein after said image-capturing device is in said second operating status and said static scene is stored, said image-capturing device is switched to said first operating status.

11. The method of starting snapping a static scene according to claim 8 wherein once said image-capturing device in said second operating status is switched to said first operating status, a snap-stopping message is shown on said display device.

12. A snap starting system, comprising:
    an image-capturing unit for capturing a scene within a visual field;
    an input unit for setting a block;
    an output unit for displaying said visual field and said block; and
    a processing unit electrically connected with said image-capturing unit, said input unit and said output unit for calculating a skin color coverage percentage of said block, and switching said image-capturing unit between a first operating status and a second operating status according to said skin color coverage percentage, wherein once said image-capturing unit is in said first operating status, said scene is captured by said image-capturing device, wherein once said image-capturing unit is in said second operating status, a delaying time is counted, and said scene is captured and stored after said delaying time, wherein said processing unit further calculates an edge intensity of said scene, and judges whether said delaying time starts to be counted according to said edge intensity.

13. The snap starting system according to claim 12 wherein said image-capturing unit comprises a web camera.

14. The snap starting system according to claim 12 wherein said input unit comprises a mouse or a keyboard.

15. The snap starting system according to claim 12 wherein said output unit comprises a display device.

16. The snap starting system according to claim 12 wherein said processing unit comprises a processor.

\* \* \* \* \*